US005737479A

United States Patent [19]
Fujinami

[11] Patent Number: 5,737,479
[45] Date of Patent: Apr. 7, 1998

[54] APPARATUS AND METHOD FOR INSERTING RATING CODE INTO THE DIGITAL VIDEO SIGNAL

[75] Inventor: Yasushi Fujinami, Kanagawa, Japan

[73] Assignee: Sony Corporation, Tokyo, Japan

[21] Appl. No.: 574,382

[22] Filed: Dec. 18, 1995

[30] Foreign Application Priority Data

Dec. 21, 1994 [JP] Japan .................... 6-335602

[51] Int. Cl.⁶ .......................... H04N 5/76; H04N 5/92
[52] U.S. Cl. .................... 386/95; 386/94; 386/111
[58] Field of Search ........................ 386/46, 95, 98, 386/94, 113, 124, 109, 111, 112; 380/5; 360/27, 39, 60; 348/423; H04N 5/92, 5/76

[56] References Cited

U.S. PATENT DOCUMENTS

| | | | |
|---|---|---|---|
| 4,930,158 | 5/1990 | Vogel | 380/5 |
| 5,172,111 | 12/1992 | Olivo, Jr. | 360/27 |
| 5,434,678 | 7/1995 | Abecassis | 386/128 |
| 5,502,573 | 3/1996 | Fujinami | 386/98 |
| 5,504,585 | 4/1996 | Fujinami et al. | 386/111 |
| 5,568,274 | 10/1996 | Fujinami et al. | 386/107 |
| 5,574,567 | 11/1996 | Cookson et al. | 386/46 |

*Primary Examiner*—Thai Tran
*Attorney, Agent, or Firm*—William S. Frommer; Alvin Sinderbrand

[57] ABSTRACT

In an image data coding apparatus and method thereof, an image data recording medium, and an image data decoding apparatus and method thereof, in rating mode, the unlimited parts are consecutively reproduced without reproduction of the limited parts. In the case where a rating code has been found within the entry point in reproducing operation, the succeeding image data is not reproduced and the reproducing operation is skipped to the next address which is to be reproduced. During this event, the reproduced image is uninterruptedly displayed as a consecutive image by virtue of a difference between the data rates, and the image data which is following to the entry point to which it has skipped is a GOP which certainly starts from I-picture and, therefore, can be surely reproduced.

10 Claims, 26 Drawing Sheets

| Syntax | No. of Bits | Mnemonic |
|---|---|---|
| PES_packet() { | | |
|   packet_start_code_prefix | 24 | bslbf |
|   stream_id | 8 | uimsbf |
|   PES_packet_length | 16 | uimsbf |
|   if( stream_id != program_stream_map | | |
|   && stream_id != padding_stream | | |
|   && stream_id != private_stream_2 | | |
|   && stream_id != ECM | | |
|   && stream_id != EMM | | |
|   && stream_id != program_stream_directory | | |
|   && stream_id != DSMCC_stream | | |
|   && stream_id != ITU-T Rec. H222.1 type E_stream) { | | |
|     '10' | 2 | bslbf |
|     PES_scrambling_control | 2 | bslbf |
|     PES_priority | 1 | bslbf |
|     data_alignment_indicator | 1 | bslbf |
|     copyright | 1 | bslbf |
|     original_or_copy | 1 | bslbf |
|     PTS_DTS_flags | 2 | bslbf |
|     ESCR_flag | 1 | bslbf |
|     ES_rate_flag | 1 | bslbf |
|     DSM_trick_mode_flag | 1 | bslbf |

```
additional_copy_info_flag                1   bslbf
PES_CRC_flag                             1   bslbf
PES_extension_flag                       1   bslbf
PES_header_data_length                   8   uimsbf
if (PTS_DTS_flags=='10') {
    '0010'                               4   bslbf
    PTS [32..30]                         3   bslbf
    marker_bit                           1   bslbf
    PTS [29..15]                         15  bslbf
    marker_bit                           1   bslbf
    PTS [14..0]                          15  bslbf
    marker_bit                           1   bslbf
}
if (PTS_DTS_flags=='11') {
    '0011'                               4   bslbf
    PTS [32..30]                         3   bslbf
    marker_bit                           1   bslbf
    PTS [29..15]                         15  bslbf
    marker_bit                           1   bslbf
    PTS [14..0]                          15  bslbf
    marker_bit                           1   bslbf
    '0001'                               4   bslbf
    DTS [32..30]                         3   bslbf
    marker_bit                           1   bslbf
    DTS [29..15]                         15  bslbf
```

| Syntax | No. of Bits | Mnemonic |
|---|---|---|
| marker_bit | 1 | bslbf |
| DTS [14..0] | 15 | bslbf |
| marker_bit | 1 | bslbf |
| } | | |
| if (ESCR_flag=='1') { | | |
|   reserved | 2 | bslbf |
|   ESCR_base[32..30] | 3 | bslbf |
|   marker_bit | 1 | bslbf |
|   ESCR_base[29..15] | 15 | bslbf |
|   marker_bit | 1 | bslbf |
|   ESCR_base[14..0] | 15 | bslbf |
|   marker_bit | 1 | bslbf |
|   ESCR_extension | 9 | uimsbf |
|   marker_bit | 1 | bslbf |
| } | | |
| if (ES_rate_flag == '1') { | | |
|   marker_bit | 1 | bslbf |
|   ES_rate | 22 | uimsbf |
|   marker_bit | 1 | bslbf |
| } | | |
| if (DSM_trick_mode_flag == '1') { | | |
|   trick_mode_control | 3 | uimsbf |

```
if ( trick_mode_control == fast_forward ) {
    field_id                              2    bslbf
    intra_slice_refresh                   1    bslbf
    frequency_truncation                  2    bslbf
}
else if ( trick_mode_control == slow_motion ) {
    rep_cntrl                             5    uimsbf
}
else if ( trick_mode_control == freeze_frame) {
    field_id                              2    uimsbf
    reserved                              3    bslbf
}
else if ( trick_mode_control == fast_reverse' ) {
    field_id                              2    bslbf
    intra_slice_refresh                   1    bslbf
    frequency_truncation                  2    bslbf
}
else if ( trick_mode_control == slow_reverse ) {
    rep_cntrl                             5    uimsbf
}
else reserved                             5    bslbf
}
if ( additional_copy_info_flag == '1' ) {
    marker_bit                            1    bslbf
    additional_copy_info                  7    bslbf
```

| Syntax | No. of Bits | Mnemonic |
|---|---|---|
| } | | |
| if ( PES_CRC_flag == '1' ) { | | |
|    previous_PES_packet_CRC | 16 | bslbf |
| } | | |
| if ( PES_extension_flag == '1' ) { | | |
|    PES_private_data_flag | 1 | bslbf |
|    pack_header_field_flag | 1 | bslbf |
|    program_packet_sequence_counter_flag | 1 | bslbf |
|    P-STD_buffer_flag | 1 | bslbf |
|    reserved | 3 | bslbf |
|    PES_extension_flag_2 | 1 | bslbf |
|    if ( PES_private_data_flag == '1' ) { | | |
|       PES_private_data | 128 | bslbf |
|    } | | |
|    if (pack_header_field_flag == '1' ) { | | |
|       pack_field_length | 8 | uimsbf |
|       pack_header() | | |
|    } | | |
|    if(program_packet_sequence_counter_flag=='1'){ | | |
|       marker_bit | 1 | bslbf |
|       program_packet_sequence_counter | 7 | uimsbf |

| | | |
|---|---|---|
| marker_bit | 1 | bslbf |
| MPEG1_MPEG2_identifier | 1 | bslbf |
| original_stuff_length | 6 | uimsbf |
| } | | |
| if ( P-STD_buffer_flag = '1' ) { | | |
|   '01' | 2 | bslbf |
|   P-STD_buffer_scale | 1 | bslbf |
|   P-STD_buffer_size | 13 | uimsbf |
| } | | |
| if ( PES_extension_flag_2 = '1' ){ | | |
|   marker_bit | 1 | bslbf |
|   PES_extension_field_length | 7 | uimsbf |
|   for(i=0;i<PES_extension_field_length;i++){ | | |
|     reserved | 8 | bslbf |
|   } | | |
| } | | |
| for (i=0;i<N1;i++) { | | |
|   stuffing_byte | 8 | bslbf |
| } | | |
| for (i=0;i<N2;i++) { | | |
|   PES_packet_data_byte | 8 | bslbf |

FIG. 9

| Syntax | No. of Bits | Mnemonic |
|---|---|---|
| } | | |
| else if ( stream_id == program_stream_map | | |
| \|\| stream_id == private_stream_2 | | |
| \|\| stream_id == ECM | | |
| \|\| stream_id == EMM | | |
| \|\| stream_id == program_stream_directory | | |
| \|\| stream_id == DSMCC_stream) | | |
| \|\| stream_id == ITU-T Rec. H.222.1 type E stream ( | | |
|     for ( i=0;i<PES_packet_length;i++) { | | |
|         PES_packet_data_byte | 8 | bslbf |
|     } | | |
| } | | |
| else if ( stream_id == padding_stream) { | | |
|     for ( i=0;i<PES_packet_length;i++) { | | |
|         padding_byte | 8 | bslbf |
|     } | | |
| } | | |

| Syntax | No. of bits | Mnemonic |
|---|---|---|
| program_stream_map() { | | |
|   packet_start_code_prefix | 24 | bslbf |
|   map_stream_id | 8 | uimsbf |
|   program_stream_map_length | 16 | uimsbf |
|   current_next_indicator | 1 | bslbf |
|   reserved | 2 | bslbf |
|   program_stream_map_version | 5 | uimsbf |
|   reserved | 7 | bslbf |
|   marker_bit | 1 | bslbf |
|   program_stream_info_length | 16 | uimsbf |
|   for (i=0;i<N1;i++) { | | |
|     descriptor() | | |
|   } | | |
|   elementary_stream_map_length | 16 | uimsbf |
|   for (i=0;i<N1;i++) { | | |
|     stream_type | 8 | uimsbf |
|     elementary_stream_id | 8 | uimsbf |
|     elementary_stream_info_length | 16 | uimsbf |
|     for (i=0;i<N2;i++) { | | |
|       descriptor() | | |
|     } | | |
|   } | | |
|   CRC_32 | 32 | rpchof |
| } | | |

FIG.11

| Value | Description |
|---|---|
| 0x00 | ITU-T I ISO/IEC Reserved |
| 0x01 | ISO/IEC 11172 Video |
| 0x02 | ITU-T Rec. H.262 I ISO/IEC 13818-2 Video or ISO/IEC 11172-2 constrained parameter video stream |
| 0x03 | ISO/IEC 11172 Audio |
| 0x04 | ISO/IEC 13818-3 Audio |
| 0x05 | ITU-T Rec. H.222.0 I ISO/IEC 13818-1 private_sections |
| 0x06 | ITU-T Rec. H.222.0 I ISO/IEC 13818-1 PES packets containing private data |
| 0x07 | ISO/IEC 13522 MHEG |
| 0x08 | ITU-T Rec. H.222.0 I ISO/IEC 13818-1 Annex A DSM CC |
| 0x09 | ITU-T Rec. H.222.1 |
| 0x0A | ISO/IEC 13818-6 type A |
| 0x0B | ISO/IEC 13818-6 type B |
| 0x0C | ISO/IEC 13818-6 type C |
| 0x0D | ISO/IEC 13818-6 type D |
| 0x0E | ISO/IEC 13818-1 auxiliary |
| 0x0F-0x7F | ITU-T Rec. H.222.0 I ISO/IEC 13818-1 Reserved |
| 0x80-0xFF | User Private |

FIG.12

| stream id | Note | stream coding |
|---|---|---|
| 1011 1100 | 1 | program_stream_map |
| 1011 1101 | 2 | private_stream_1 |
| 1011 1110 |  | padding_stream |
| 1011 1111 | 3 | private_stream_2 |
| 110x xxxx |  | ISO/IEC 13818-3 or ISO/IEC 11172-3 audio stream number x xxxx |
| 1110 xxxx |  | ITU-T Rec. H.262 I ISO/IEC 13818-2 or ISO/IEC 11172-2 video stream number xxxx |
| 1111 0000 | 3 | ECM_stream |
| 1111 0001 | 3 | EMM_stream |
| 1111 0010 | 5 | ITU-T Rec. H.222.0 I ISO/IEC 13818-1 Annex A or ISO/IEC 13818-6_DSMCC_stream |
| 1111 0011 | 2 | ISO/IEC_13522_stream |
| 1111 0100 | 6 | ITU-T Rec. H.222.1 type A |
| 1111 0101 | 6 | ITU-T Rec. H.222.1 type B |
| 1111 0110 | 6 | ITU-T Rec. H.222.1 type C |
| 1111 0111 | 6 | ITU-T Rec. H.222.1 type D |
| 1111 1000 | 6 | ITU-T Rec. H.222.1 type E |
| 1111 1001 | 7 | ancillary_stream |
| 1111 1010 ~ 1111 1110 |  | reserved data stream |
| 1111 1111 | 4 | program_stream_directory |

The notation x means that the value '0' or '1' are both permitted and results in the same stream type. The stream number is given by the values taken by the x's.

Note 1: PES packets of type program_stream_directory have unique syntax specified in 2.5.4.1 on page 63.

Note 2: PES packets of type private_stream_1 and ISO/IEC_13552_stream follow the same PES packet syntax as those for ITU-T Rec. H.222.0 | ISO/IEC 13818-2 video and ISO/IEC 13818-3 audio streams.

Note 3: PES packets of type private_stream_2, ECM_stream and EMM_stream are similar to private_stream_1 except no syntax is specified after PES_packet_length field.

Note 4: PES packets of type program_stream_directory have a unique syntax specified in.2.5.5.1 on page 65.

Note 5: PES packets of type DSM-CC_stream have a unique syntax specified in ISO/IEC 13818- 6, which is a compatible extension of ITU-T Rec. H.222.0 | ISO/IEC 13818-1 Annex A.

Note 6: This stream_id is associated with stream_type 0x09 in table 2-36 on page 64.

Note 7. This stream_id is only used in PES packets, which carry data from a Program Stream or an ISO/IEC 11172-1 System Stream, in a Transport Stream.

| Syntax | No. of Bits | Mnemonic |
|---|---|---|
| directory_PES_packet() { | | |
|   packet_start_code_prefix | 24 | bslbf |
|   directory_stream_id | 8 | uimsbf |
|   PES_packet_length | 16 | uimsbf |
|   number_of_access_units | 15 | uimsbf |
|   marker_bit | 1 | bslbf |
|   prev_directory_offset[44..30] | 15 | uimsbf |
|   marker_bit | 1 | bslbf |
|   prev_directory_offset[29..15] | 15 | uimsbf |
|   marker_bit | 1 | bslbf |
|   prev_directory_offset[14..0] | 15 | uimsbf |
|   marker_bit | 1 | bslbf |
|   next_directory_offset[44..30] | 15 | uimsbf |
|   marker_bit | 1 | bslbf |
|   next_directory_offset[29..15] | 15 | uimsbf |
|   marker_bit | 1 | bslbf |
|   next_directory_offset[14..0] | 15 | uimsbf |
|   marker_bit | 1 | bslbf |
|   for(i = 0; i < number_of_access_units; i++) { | | |
|     packet_stream_id | 8 | uimsbf |
|     PES_header_position_offset_sign | 1 | tcimsbf |
|     PES_header_position_offset[43..30] | 14 | uimsbf |

| | | |
|---|---|---|
| marker_bit | 1 | bslbf |
| PES_header_position_offset[29..15] | 15 | uimsbf |
| marker_bit | 1 | bslbf |
| PES_header_position_offset[14..0] | 15 | uimsbf |
| marker_bit | 1 | bslbf |
| reference_offset | 16 | uimsbf |
| marker_bit | 1 | bslbf |
| reserved | 3 | bslbf |
| PTS[32..30] | 3 | uimsbf |
| marker_bit | 1 | bslbf |
| PTS[29..15] | 15 | uimsbf |
| marker_bit | 1 | bslbf |
| PTS[14..0] | 15 | uimsbf |
| marker_bit | 1 | bslbf |
| bytes_to_read[22..8] | 15 | uimsbf |
| marker_bit | 1 | bslbf |
| bytes_to_read[7..0] | 8 | uimsbf |
| marker_bit | 1 | bslbf |
| intra_coded_indicator | 1 | bslbf |
| coding_parameters_indicator | 2 | bslbf |
| reserved | 4 | bslbf |

| descriptor tag | TS | PS | Identification |
|---|---|---|---|
| 0 | n/a | n/a | Reserved |
| 1 | n/a | n/a | Reserved |
| 2 | X | X | video_stream_descriptor |
| 3 | X | X | audio_stream_descriptor |
| 4 | X | X | hierarchy_descriptor |
| 5 | X | X | registration_descriptor |
| 6 | X | X | data_stream_alignment_descriptor |
| 7 | X | X | target_background_grid_descriptor |
| 8 | X | X | video_window_descriptor |
| 9 | X | X | CA_descriptor |
| 10 | X | X | ISO_639_language_descriptor |
| 11 | X | X | system_clock_descriptor |
| 12 | X | X | multiplex_buffer_utilization_descriptor |
| 13 | X | X | copyright_descriptor |
| 14 | X | | maximum bitrate descriptor |
| 15 | X | X | private data indicator descriptor |
| 16 | X | X | smoothing buffer descriptor |
| 17 | X | X | STD_descriptor |
| 18 | X | n/a | IBP descriptor |
| 19-63 | n/a | n/a | ITU-T Rec. H.222.0 | ISO/IEC 13818-1 Reserved |
| 64-255 | | | User Private |

*FIG.19*

| Syntax | No. of bits | Mnemonic |
|---|---|---|
| video_stream_descriptor(){ | | |
|   descriptor_tag | 8 | uimsbf |
|   descriptor_length | 8 | uimsbf |
|   multiple_frame_rate_flag | 1 | bslbf |
|   frame_rate_code | 4 | uimsbf |
|   MPEG_1_only_flag | 1 | bslbf |
|   constrained_parameter_flag | 1 | bslbf |
|   still_picture_flag | 1 | bslbf |
|   if (MPEG_1_only_flag == 1){ | | |
|     profile_and_level_indication | 8 | uimsbf |
|     chroma_format | 2 | uimsbf |
|     frame_rate_extension_flag | 1 | bslbf |
|     reserved | 5 | bslbf |
|   } | | |
| } | | |

FIG. 20

| Syntax | No. of bits | Mnemonic |
|---|---|---|
| rating_descriptor(){ | | |
|     descriptor_tag | 8 | uimsbf |
|     descriptor_length | 8 | uimsbf |
|     start_sector_address | 32 | uimsbf |
|     end_sector_address | 32 | uimsbf |
| } | | |

APPARATUS AND METHOD FOR INSERTING RATING CODE INTO THE DIGITAL VIDEO SIGNAL

BACKGROUND OF THE INVENTION

1. Field of the Invention

The present invention relates to an image data coding device and method thereof, an image data recording medium, and an image data decoding device and method thereof, and more particularly to an improvement of those in which the limited parts and the nonlimited parts are used properly when digital moving image data and digital aural data are compressed and recorded on, for instance, an optical disk in a time-division multiplexed manner and then reproduced.

2. Description of the Related Art

Heretofore, with respect to movies or video systems which are disclosed to many and unspecified listeners, there is an adult assignment, that is "Rating". In the case where a movie includes inadequate representations for minors, the producer side independently specifies this movie as adult assignment and prevents being viewed by minors. Selling or transfer of a video disk, etc. which has been similarly specified as adult assignment is inhibited.

Rating in the United States have not been provided in the statute but have been determined by producers (distributors, dealers) voluntarily.

According to the document "THE MOVIE BUSINESS BOOK, pp 396–406, 'THE VOLUNTARY MOVIE RATING SYSTEM'", they are categorized into five categories of:

"G", General Audiences—All ages admitted;
"PG", Parental Guidance Suggested, some material may not be suitable for children;
"PG-13", Parents strongly cautioned. Some material may be inappropriate for children under 13;
"R", Restricted, under 17 requires accompanying parent or adult guardian; and
"NC-17", No children under 17 admitted.

Therefore, in accordance with these assignments, entrance to a movie theater is restricted and selling of a video tape, etc. is limited. Formerly, one rating level has been assigned to an entire movie, and this rating level has been utilized to be compared with ages of visitors (buyers) at a movie theater or a video shop. In contrast with an artificial action like this, there is an idea wherein a video disk, etc. which has been specified as adult assignment is forcibly inhibited from being viewed by minors on a reproducer side. In this case, a flag for indicating whether there is an adult assignment or not is previously written into a video disk, etc., and this is detected on a reproducer side and reproducing is inhibited hereby. This function is called as a rating system, and simply referred to as rating, hereinafter.

As to the digital broadcasting system of Europe, there is the description of "Parental Rating" within the definition of the service information. This broadcasting system has defined a method of describing an age, so it is considered that a receiver is able to apply rating on the basis of this age. In the case where only a certain scene of the program is the problem, an identification code is written on the just before position of starting of the program, in the abovementioned rating system. In the case where the mode of the reproducing device is rating, that identification code is identified, and the program is not reproduced but stopped. In this case, the entire program can not be viewed.

While, a reproducing device can be considered which don't normally reproduce only a problem scene when it has detected an identification code, which has been written into just before position of the problem scene, in reproducing operation. For instance, a technique of skipping a problem scene at the time when an identification code is detected, has been proposed in the specification and drawings of the U.S. patent reissued Ser. No. 33,116 by the present applicant.

Further, a noise is put on that scene, or a specific pattern is displayed. Accordingly, other parts can be reproduced excepting that scene.

However, in such a system, a viewer has to wait for a while until a normal reproduction returns at the end of that scene. Therefore, continuity of the program is hurt. Because lengths of scenes which are subjected to limitation are different, a viewer has to watch a noisy screen or a specific pattern until returning to a normal reproduction, hence it is yet unsatisfactory in the point of usability.

Further, in the case where a movie is supplied with a disk form or tape form recording medium, special reproductions such as high-speed searching, etc. are enabled. The problem scene may be reproduced by any chance in such special reproductions, so it was not yet sufficient for a solution.

Particularly, in the MPEG-2 Video standard which has been defined as international standards in recent years, since image data is recorded on a recording medium with variable length codes, the number of frames and don't coincide with the number of sectors. Therefore, it is difficult to specify the end of a problem scene, and the scene cannot be skipped easily.

SUMMARY OF THE INVENTION

In view of the foregoing, an object of the present invention is to provide an image data coding apparatus and method thereof, an image data recording medium, and an image data decoding apparatus and method thereof which do not reproduce the limited parts and is able to reproduce the nonlimited parts consecutively in a rating mode.

The foregoing object and other objects of the present invention have been achieved by the provision of an image data coding method for recording digital moving image data and digital aural data on a predetermined recording medium in a time-division multiplexing manner, comprising: a packet partition step of partitioning at least the digital moving image data into packets; an entry point detecting step of detecting an entry point included in a coded image in a frame which is present, by at least one sheet, in the packet; a rating code adding step of adding a rating code to the entry point; and an entry point placing step of inserting the entry point between the packets of the digital moving image data.

Further, in the present invention, an image data coding apparatus for recording digital moving image data and digital aural data on a predetermined recording medium in a time-division multiplexing manner, comprising: a packet partition means for partitioning at least the digital moving image data into packets; an entry point detecting means for detecting an entry point included in a coded image in a frame which is present, by at least one sheet, in the packet; a rating code adding means for adding a rating code to the entry point; and an entry point placing means for inserting the entry point between the packets of the digital moving image data.

Further, in the present invention, an image data recording medium recorded digital moving image data and digital aural data thereon in a time-division multiplexing manner, wherein at least the digital moving image data is partitioned into packets; a rating code is added to an entry point included in a coded image in a frame which is present, by at least one sheet, in the packet; and the entry point is inserted between the packets of the digital moving image data, and recorded.

Further, in the present invention, an image data decoding method for reproducing an image data recording medium in which digital moving image data and digital aural data have been recorded with time-division multiplexing, in such a manner that at least the digital moving image data has been partitioned into packets, a rating code has been added to an entry point included in a coded image in a frame which is present, by at least one sheet, in the packet, and the entry point has been inserted between the packets of the digital moving image data and recorded, comprising: an entry point detecting step of detecting at least the entry point out of a bit stream which is obtained from the image data recording medium; a rating code detecting step of detecting whether a rating code exists in the entry point or not; a seek starting step of starting a seek operation on the basis of detection of the rating point; and a decoding position changing step of changing the decoding position to the other the entry point on the basis of the seek operation.

Further, in the present invention, an image data decoding apparatus for reproducing an image data recording medium in which digital moving image data and digital aural data have been recorded with time-division multiplexing, in such a manner that at least the digital moving image data has been partitioned into packets, a rating code has been added to an entry point included in a coded image in a frame which is present, by at least one sheet, in the packet, and the entry point has been inserted between the packets of the digital moving image data and recorded, comprising: an entry point detecting means for detecting at least the entry point out of a bit stream which is obtained from the image data recording medium; a rating code detecting means for detecting whether a rating code exists in the entry point or not; a seek starting means for starting a seek operation on the basis of detection of the rating point; and a decoding position changing means for changing the decoding position to the other the entry point on the basis of the seek operation.

In reproducing operation, if a rating code is found in the entry point, then the following image data is not reproduced, and the reproducing operation skips to the next address which is to be reproduced. During this event, the reproduced image is uninterruptedly displayed as a consecutive image, by virtue of a difference between the data rates. Besides, the image data which is following to the entry point to which it has skipped is a GOP which certainly starts from I-picture, therefore reproduction can be surely performed. Besides, variable speed reproduction certainly identifies the entry point and then operates, hence it is needed to read surely the entry point, therefore the rating code in the entry point is certainly detected, so that rating operation is surely performed.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 6 is a table explaining syntax of a PES packet of FIG. 5;

FIG. 7 is a table explaining syntax of a PES packet of FIG. 5;

FIG. 8 is a table explaining syntax of a PES packet of FIG. 5;

FIG. 9 is a table explaining syntax of a PES packet of FIG. 5;

FIG. 11 is a table explaining syntax of a program stream map of FIG. 10;

FIG. 12 is a table explaining a stream type lying in the program stream map;

FIG. 16 is a table explaining the content of the stream-ID;

FIG. 18 is a table explaining the PES packet lying in the program stream;

FIG. 19 is a table explaining the descriptor of MPEG;

FIG. 20 is table explaining the video stream descriptor;

DETAILED DESCRIPTION OF THE EMBODIMENT

Preferred embodiments of the present invention will be described with reference to the accompanying drawings:

(1) Rating System of the Embodiment

This embodiment shows the case where the present invention is applied to a disk (hereinafter, an optical disk, a magnetic disk, etc. are generically referred to as simply a disk). The recording medium is not limited to a disk, but various recording media such as a tape form recording medium, a semiconductor memory, etc. may be used. Because access speed of a disk is comparatively high, it is able to correspond to plural ratings using one medium. In other words, by switching a rating-level setting switch which has been provided on a player side, one sheet of disk can be reproduced selectively as a movie which is not limited by rating or a movie which is limited by rating. As described above, there is a country which has provided the standard of which levels of rating are more than two, however, it is deemed that a device which is able to cope with two kinds, a non-limitation mode and a limitation mode, will be sufficient substantially.

The concept of the rating system of this embodiment will be described. On the disk, an entire movie which has been wholly encoded is recorded. A rating identification code is written into an entry point of a risky part which has to be eliminated when it is viewed in the general specification mode (the non-limitation mode).

Figure 1A:
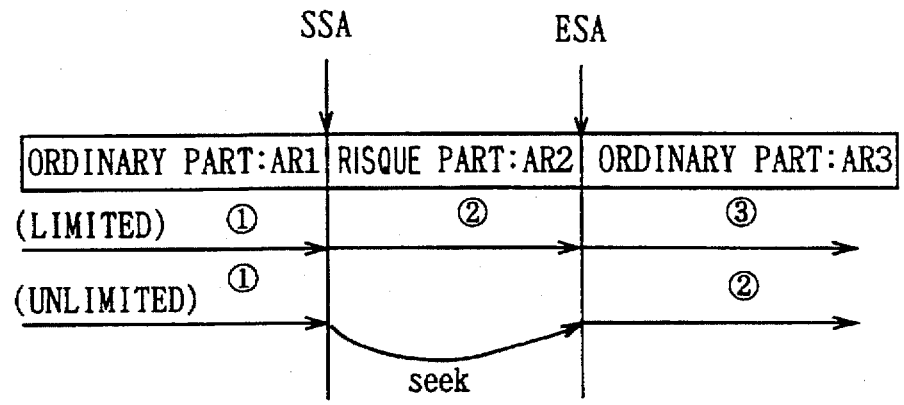
FIG. 1A is a schematic diagram explaining the principle of the rating system according to the present invention.

FIG. 1A shows an example of reproduction of a disk according to the rating system of this embodiment. In the limitation mode, reproduction is performed in the order of the ordinary part AR1, the risque part AR2 and the ordinary part AR3, and the entire disk is reproduced. In contrast to this, in the non-limitation mode, after reproduction of the ordinary part AR1, the risque part AR2 which is extending from a start-sector address (SSA) till an end-sector address (ESA) is skipped by seek operation by means of the rating identification code of the entry point, and then the ordinary part AR3 is reproduced. Therefore, in reproduction of the non-limitation mode, the risque part AR2 is eliminated from that of the limitation mode.

Figure 1B:
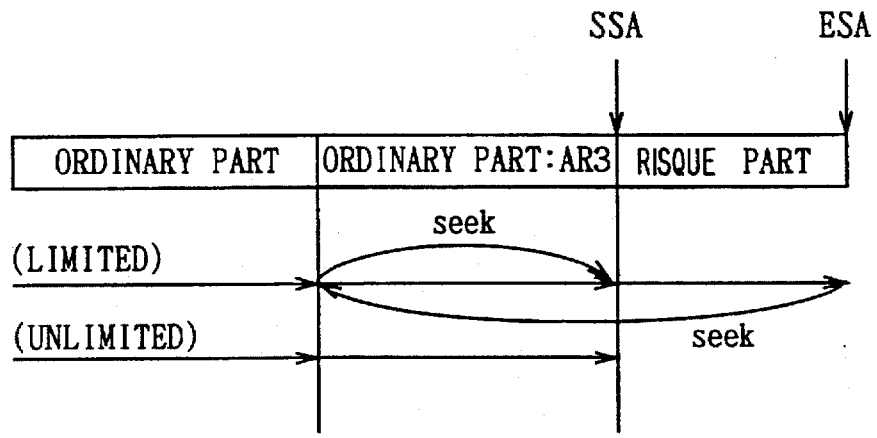
FIG. 1B is a schematic diagram explaining the principle of the another rating system according to the present invention.

FIG. 1B shows an example of a method in which the risque parts AR2 are collectively written into the other area of the disk. In such a method, the limitation mode has the priority, and encoding is performed such that a convenience of a common viewer is most suited. Besides, the data of the risque parts AR2 are practically found on the basis of the recording area on the disk, therefore, it can be realized with a simple reproducing device. In the case of viewing by the non-limitation mode, after reproduction of the common part AR1, a seek operation is performed and then the risque part AR2 which is extending from SSA till ESA is reproduced. Then, seek operation is performed once more, and the common part AR3 is reproduced. In this method, it is needed that the data of the risque part AR2 which is in distant area is inserted and reproduced, therefore an access time will occur. Particularly, in the case where many risque parts AR2 exist, accessing is repeated, so there is a possibility of raising problems thereby. Besides, there is such a disadvantage that management of addresses is complicated. If the above problems are eliminated, this method can be realized.

By enabling to identify a risque part AR2 as stated above, it becomes possible to reproduce skipping that part or to reproduce inserting that part. This is an important point for implementing a rating system. To identify this risque part AR2, an identification code is added to that part, and identification of that code is performed. However, a smooth reproducing operation cannot be performed by merely adding an identification code. For instance, if reproducing operation is merely broken on the basis of detection of the identification code, that break will be recognized by the viewer, hence it cannot be referred to as a smooth reproduction.

Therefore, an entry point is used in this embodiment. The entry point is that which has been proposed in the U.S. patent application Ser. No. 08/446,015, filed on May 19, 1995, which is a continuation application of the U.S. patent application. Ser. No. 08/125,573, filed on Sep. 22, 1993, by the present applicant. Explaining briefly, in MPEG video system, a moving image is treated such that a group of pictures (hereinafter, referred to as a GOP) is treated in a block. In other words, a plurality of intra-picture (a coded image within an image; referred to as a popular name of I-picture) and a plurality of inter-picture (a coded image between images; referred to as a popular name of P-picture or B-picture) are treated as one group. In the GOP, a starting picture is always I-picture, therefore, only I-pictures are decoded and reproduced so as to perform, for instance, high-speed searching.

However, in MPEG2, it is difficult to specify the position of the I-picture, owing to the fact that changing of the number of the pictures included in a GOP is possible, and that if the number of the pictures included in a GOP is fixed, in the case where variable-rate recording into the recording medium has been performed, starting of the GOP become random, etc. So, in the preceding patent application, an entry point has been introduced, and an entry packet has been provided just before the packet in which the first I-picture of the GOP exists, and a flag has been added to this packet as an entry point. Besides, into that entry point, the positions or the distances with respect to the entry points of neighboring before and after three points have been written.

Accordingly, in the case of, for instance, searching, only I-pictures can be easily decoded and reproduced continuously, by accessing from the present entry point to the next entry point. Further, to perform high-speed searching, accessing to the distant entry point is performed. In this preceding application, an entry point has been implemented with an entry packet. However, as to an entry point, a usual data packet is possible to be defined as an entry point by adding an identification code.

Figure 2:
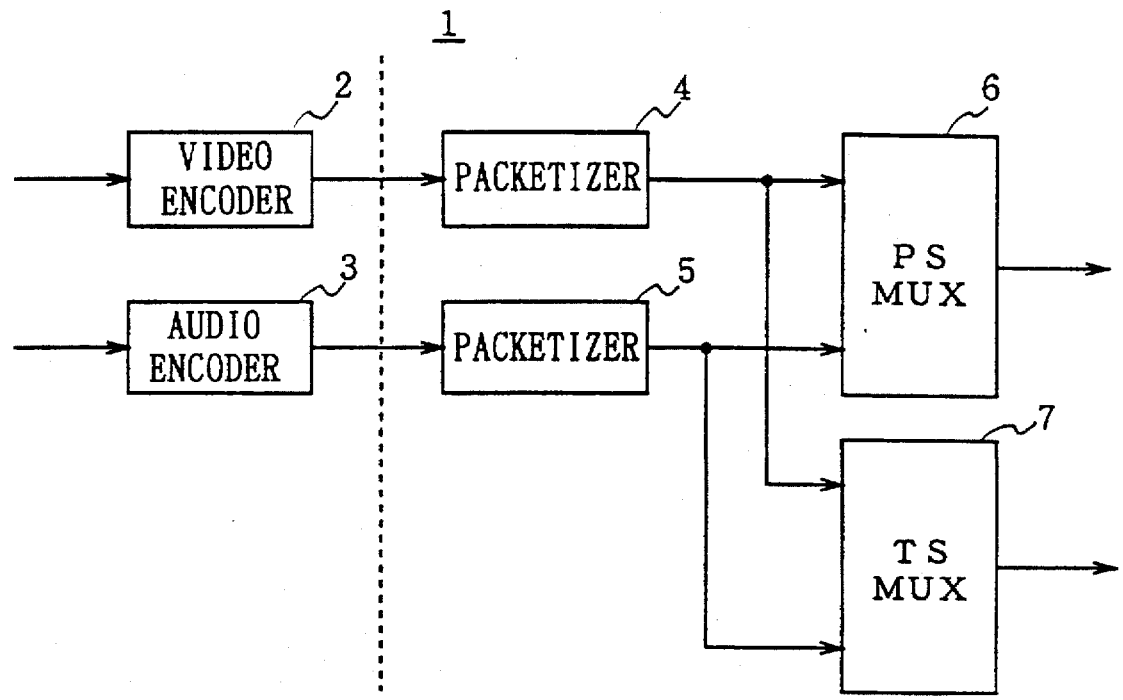
FIG. 2 is a block diagram showing an encoder of MPEG-system which is a premise of the present invention.
Figure 3:
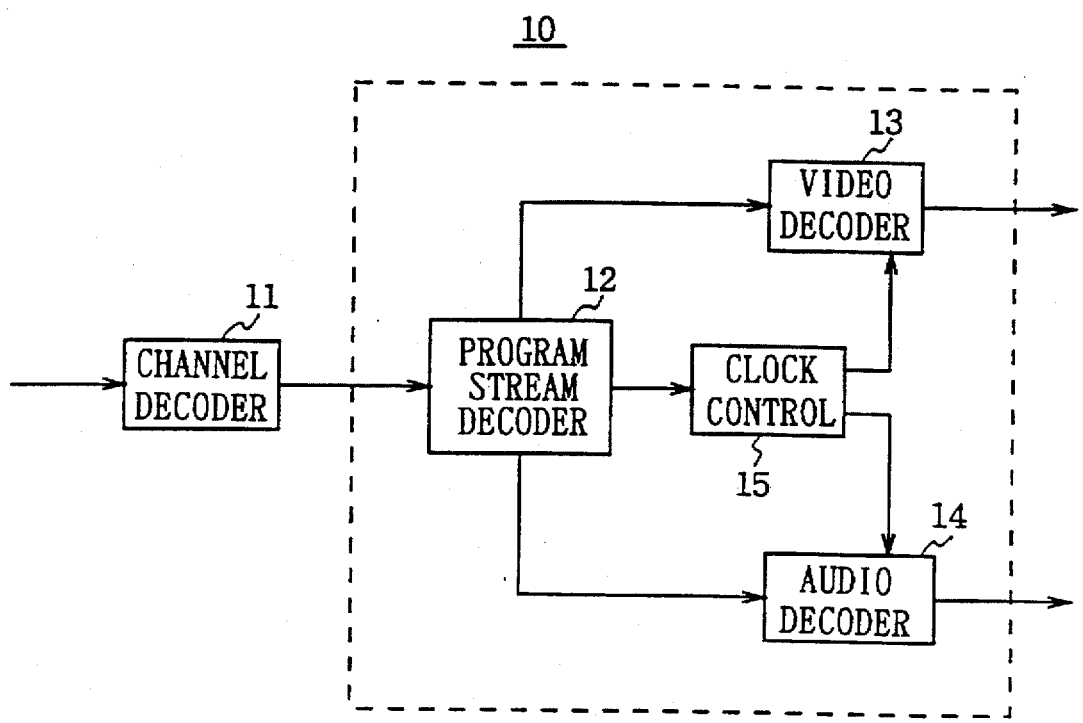
FIG. 3 is a block diagram showing a decoder of MPEG-system which is a premise of the present invention.

Therefore, in this embodiment, the case is explained where a packet of a bit-stream of MPEG-system, which is the international standard proposed by ISO/IEC JTC1/SC29/WG11, is utilized for implementation. FIG. 2 shows a schematic construction of the encoder 1 prescribed in the above MPEG-system which has been proposed by ISO/IEC JTC1/SC29/WG11, and FIG. 3 shows a schematic construction of the decoder 10 also prescribed in the MPEG-system. At first, in the encoder 1, a video data and an audio data are respectively encoded by encoders 2 and 3, packetized with packetizers 4 and 5 so that a video packetized elementary stream and an audio packetized elementary stream are formed, and then formed into a program stream and a transport stream with multiplexers 6 and 7 respectively. The program stream is modulated by the stated modulator, and stored in a recording medium such as an optical disk.

On the other hand, in the decoder 10, the channel signal which has been read from a recording medium such as an optical disk is decoded by a channel specific decoder 11, so that the program stream is obtained. The selected program stream is separated into video data, audio data and clock data by a program stream decoder 12, and then supplied to a video decoder 13, an audio decoder 14 and a clock control 15. The video decoder 13 and the audio decoder 14 decodes the video data and the audio data, in response to the clock which is supplied from the clock control 15.

Figure 4:
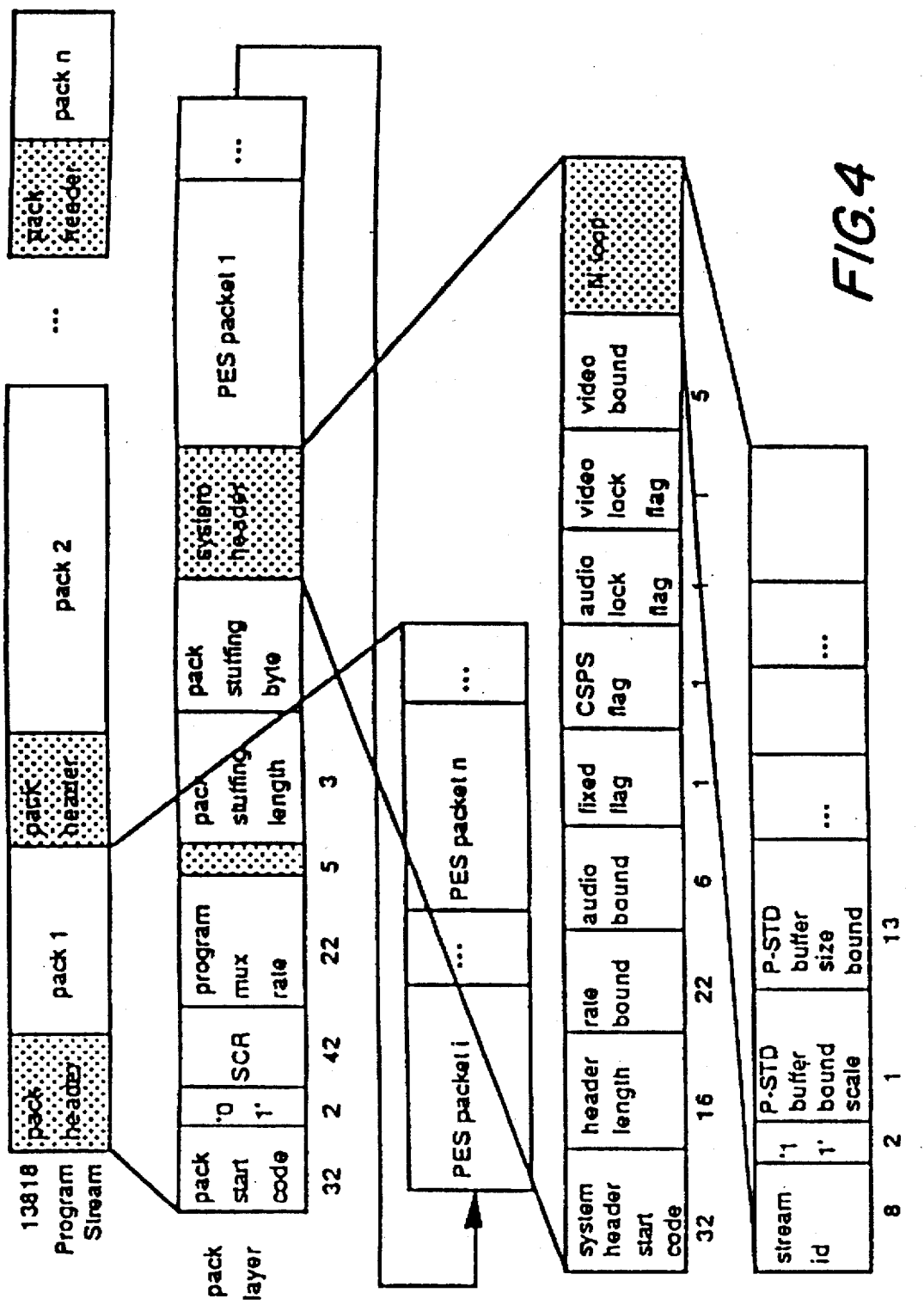
FIG. 4 is a schematic diagram explaining a layout of a program stream in MPEG.

Because this invention assumes a recording medium, hereinafter the description is performed with respect to the program stream, and the description of the example of application to the transport stream is omitted. However, the present invention can be directly applied to a system in which the transmitting side transmits the data while monitoring the state of the receiving side by, for instance, bi-directional transmission. The program stream of MPEG is composed of a system layer and a compression layer. The system layer is composed of a pack layer and a PES (packetized elementary stream) packet layer. FIG. 4 shows a layout of the program stream. Therefore, the program stream of MPEG includes one system header and at least one PES packet.

Figure 5:
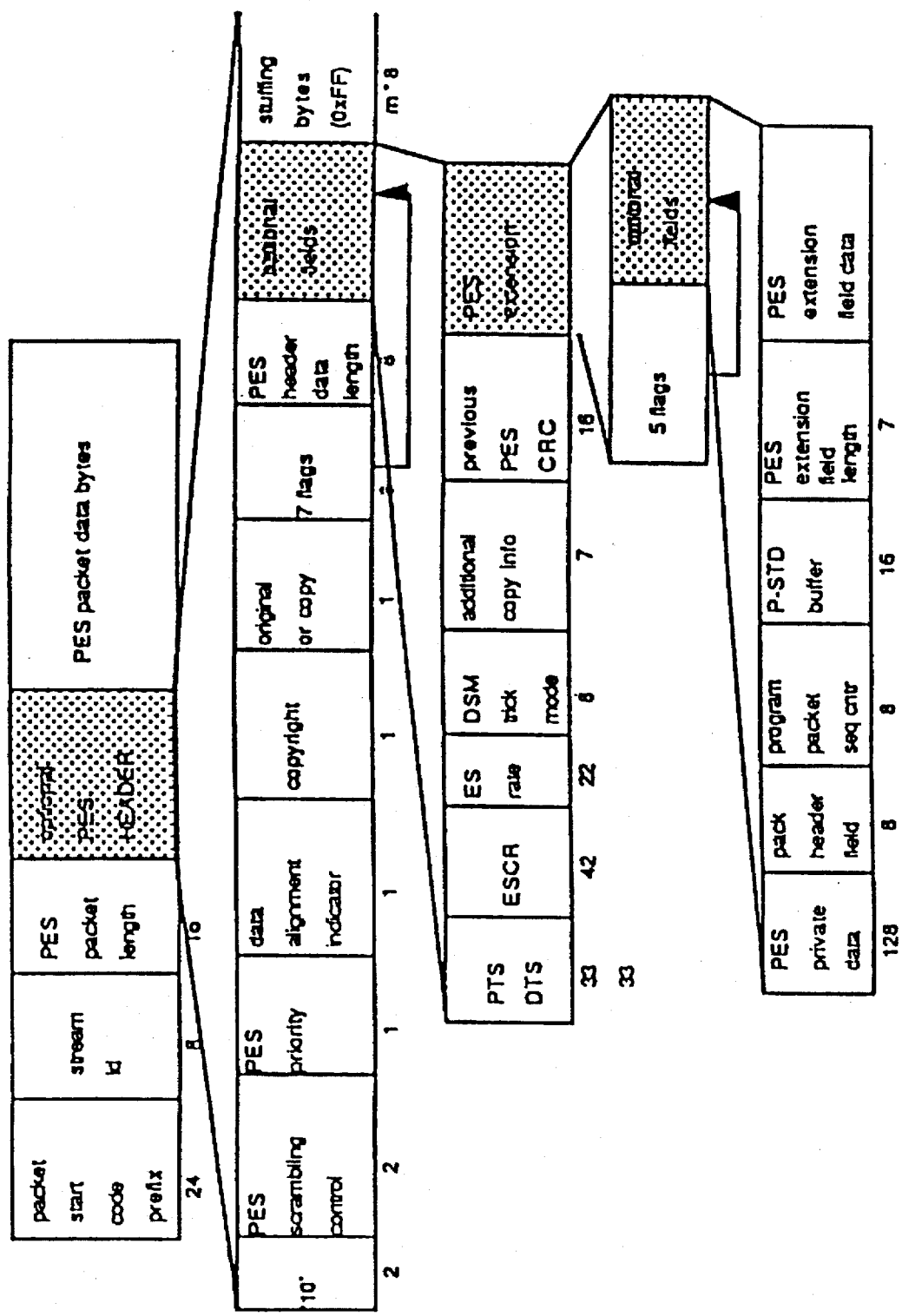
FIG. 5 is a schematic diagram explaining a layout of a PES packet lying in the program stream of FIG. 4.
Figure 10:
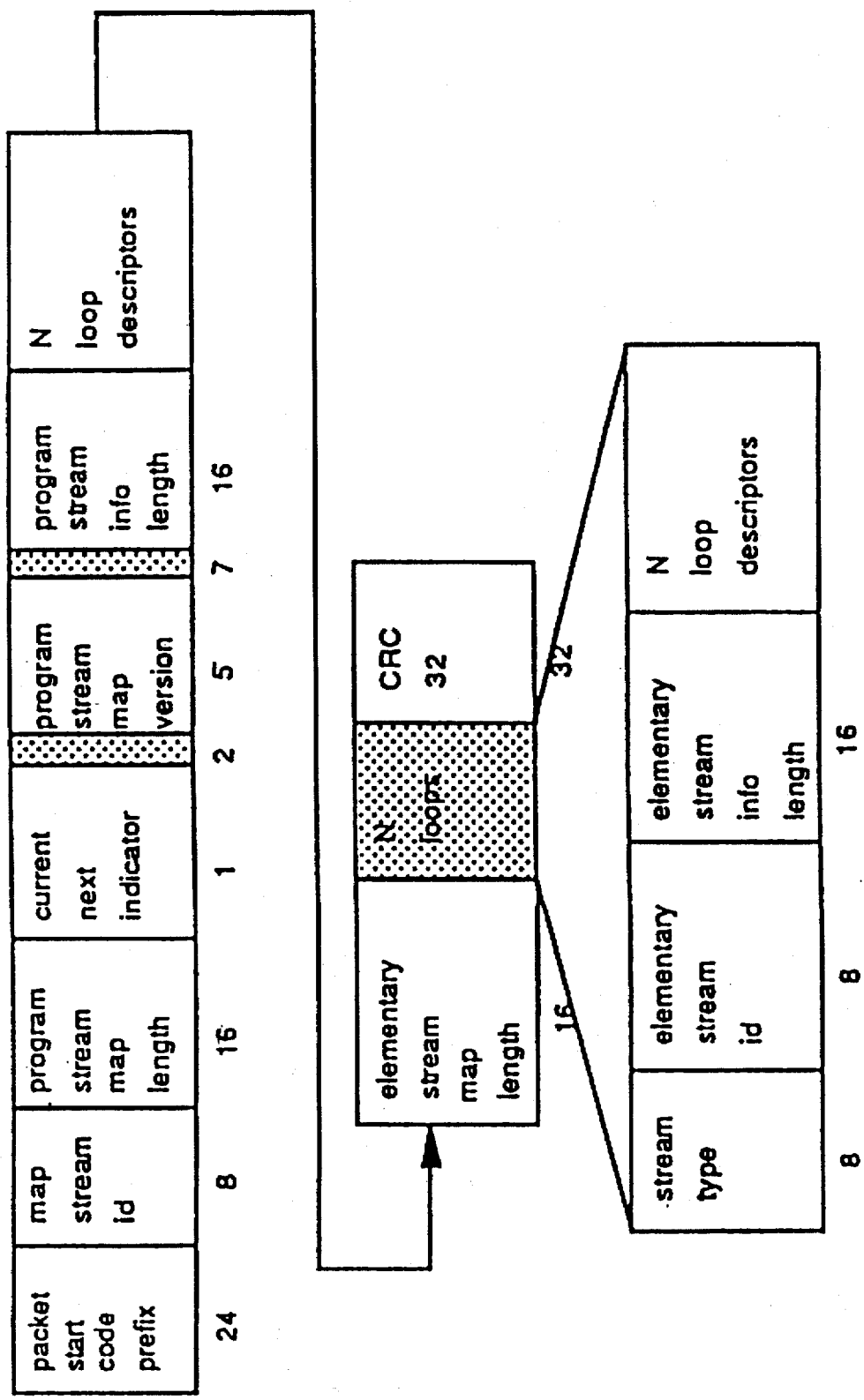
FIG. 10 is a schematic diagram explaining a layout of a program stream map of MPEG.

The PES packet is composed of a PES packet header and a data which is following to that header, as shown in a layout of FIG. 5 and syntax of FIGS. 6 to FIG. 9. With respect to an elementary stream of the program stream, a definition is given by a program stream map. A layout and a syntax of the program stream map is shown in FIG. 10 and FIG. 11. Therefore, for instance, with respect to data species of the PES (an MPEG-video, an MPEG-audio, and others), a definition is given with the stream types of the program stream map (FIG. 12). Details of these are described in said MPEG standards, hence only the parts needed for implementation will be explained herein.

If an explanation is given by extracting from said MPEG standards with respect to said PES packet, in FIGS. 6 to 9 the syntax of the PES packet is shown, and various definitions such as a packet start code prefix (24 bits) for identification of the PES packet are described. This is the PES packet of FIG. 5 which has been represented as a table. In this embodiment, an entry point is described using three packets. That is, with a program stream directory, the distances from the present packet till the before and after three entry points are described, by the prev directory offset which is defined with said PES packet and the present directory offset. Besides, various information is recorded with a program stream map, and a time code is recorded with a time code stream.

(2) Image Data Coding/Decoding Apparatus of the Embodiment

Figure 13:
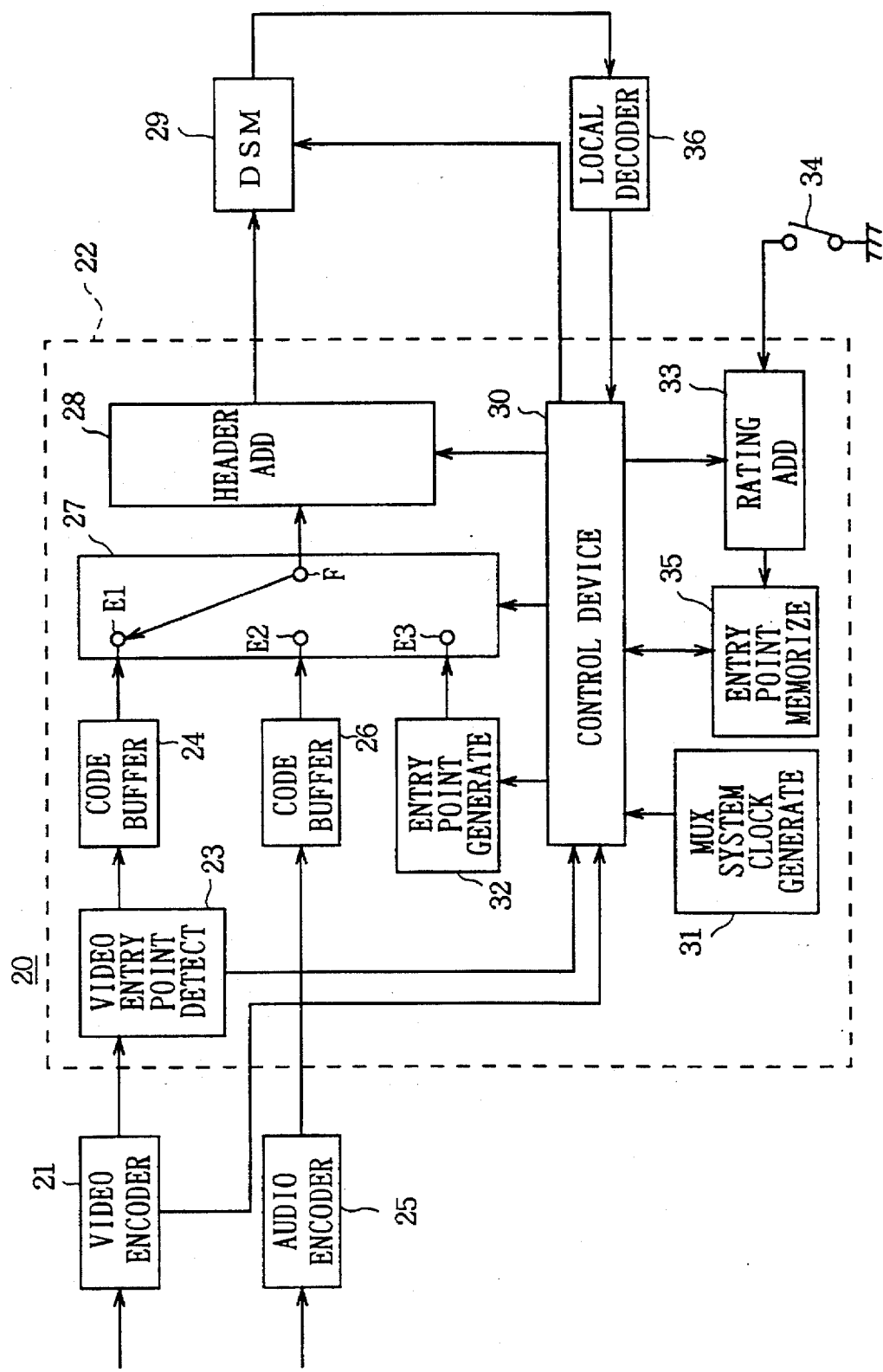
FIG. 13 is a block diagram showing the image data coding apparatus of the embodiment.
Figure 14:
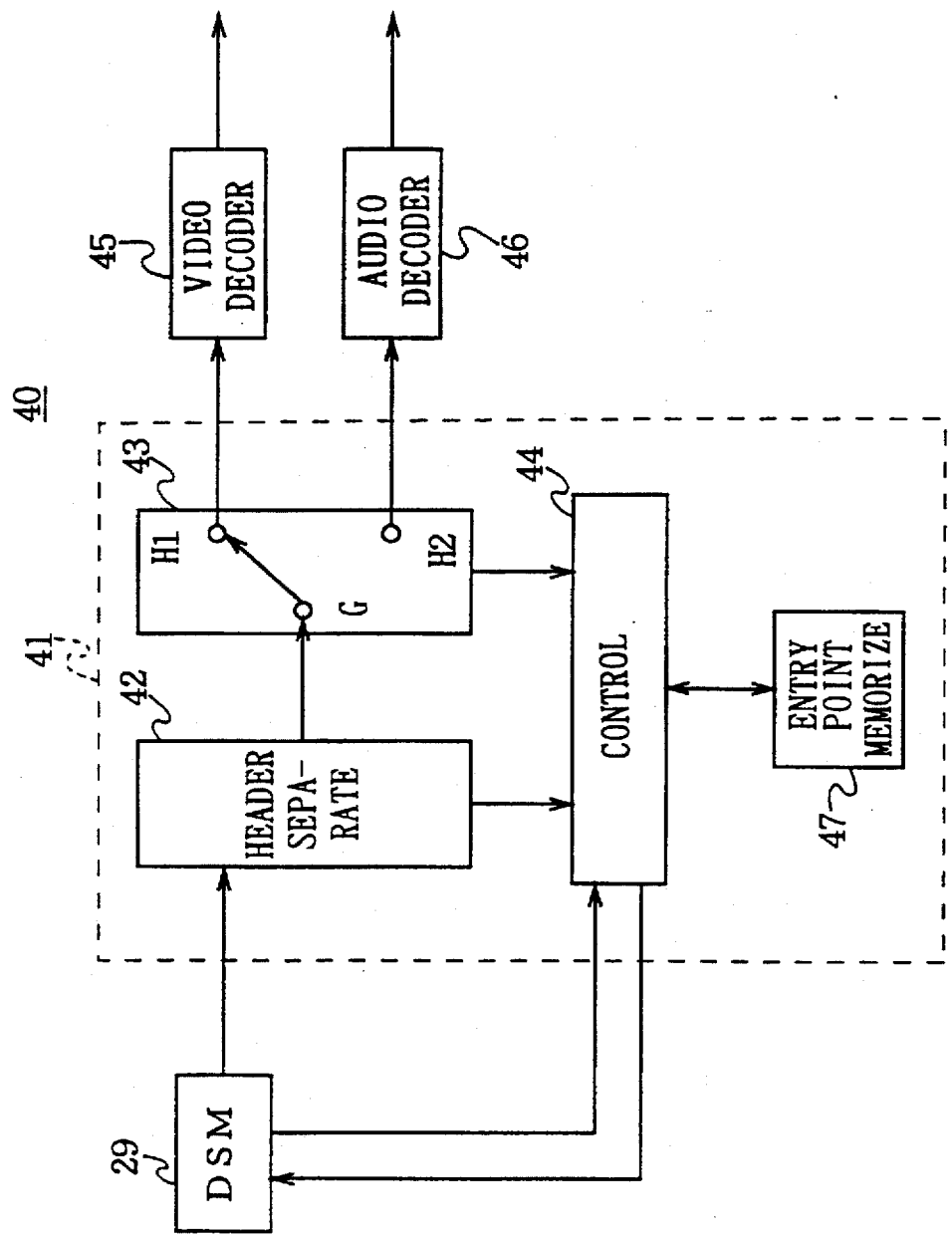
FIG. 14 is a block diagram showing the image data decoding apparatus of the embodiment.

FIGS. 13 and 14 show an embodiment of the image data coding apparatus 20 and the image data decoding apparatus 40 according to the present invention. At first, in the image data coding apparatus 20, a video signal is compressed and encoded by a video encoder 21, passed through a video entry point detecting circuit 23 which is contained in a multiplexer 22, and inputted to a code buffer 24. An audio signal is compressed and encoded by an audio encoder 25, and inputted to a code buffer 26 of the multiplexer 22.

Output terminals of the code buffers 24 and 26 are connected to input terminals E1 and E2 of a switching circuit 27, respectively. An output terminal F of the switching circuit 27 is connected to an input terminal of a header adding circuit 28. The output of the header adding circuit 28 is supplied to a driving device (DSM) 29 for driving a disk-shaped recording medium such as a magneto-optical disk A a magnetic disk (hard disk).

A control device 30 receives a system clock input which is outputted by a multiplexing system clock generating circuit 31, connects sequentially the input terminals E1 and E2 of the switching circuit 27 to the output terminal F at a predetermined period, takes the data out of the code buffers 24 and 26 sequentially, and performs time-division multiplexing. The control device 30 controls the switching circuit 27 and the header adding circuit 28, such that a bit stream of MPEG is generated.

An entry point generating circuit 32 receives a control input from the control device 30, and supplies its output to an input terminal E3 of the switching circuit 27. Besides, the control device 30 receives the system clock input which is outputted by the multiplexing system clock generating circuit 31, connects sequentially the input terminals E1, E2 and E3 of the switching circuit 27 to the output terminal F at a predetermined period, takes the data out of the code buffers 24, 26 or the entry point generating circuit 32 sequentially to perform time-division multiplexing, and outputs it to the header adding circuit 28.

Besides, the control circuit 30 controls the header adding circuit 28, and causes it to add a video packet header to the video data which has been read from the code buffer 24. While, to the audio data which has been read from the code buffer 26, an audio packet header is added. Further, the control device 30 receives the entry point generating signal input which is generated at the timing of generating of the I-picture, controls the entry point generating circuit 32, and causes it to insert an entry point to the stated position of the bit stream. In the case where the video encoder 21 is constituted such that it can output the entry point generating signal, the video encoder 21 outputs the entry point generating signal at the timing of generating of the I-picture.

When a rating switch 34 is in ON state, a rating addition circuit 33 describes a rating-descriptor of the entry point of that time. An entry point memorizing device 35 is provided for description of a position and a content of an entry point. That is, an identification code for rating is added to the entry point which has been determined by the control device 30 on the basis of the signal from the video encoder 21 or the video entry point detecting circuit 23, on the basis of rating information from the rating addition circuit 33. The rating switch 34 is required to merely specify a limited part. Therefore, Rating-descriptor and SSA of the entry point are determined.

At an unlimited part, the rating switch 34 is in OFF state, and a rating descriptor of the entry point from that time is not described. The position at which the rating switch 34 has been turned off corresponds to ESA. As a result, to each entry point, the rating descriptor and SSA are memorized. As to a bit stream of a DSM 29, editing of only the entry point is performed by a local decoder 36. That is, ESA is determined on the basis of the rating descriptor and SSA of each entry point. The determined ESA is described in each entry point sequentially from the oldest entry point to which SSA is described. Therefore, in all of entry points of the limited part, the rating descriptor and SSA/ESA are described.

Figure 15:
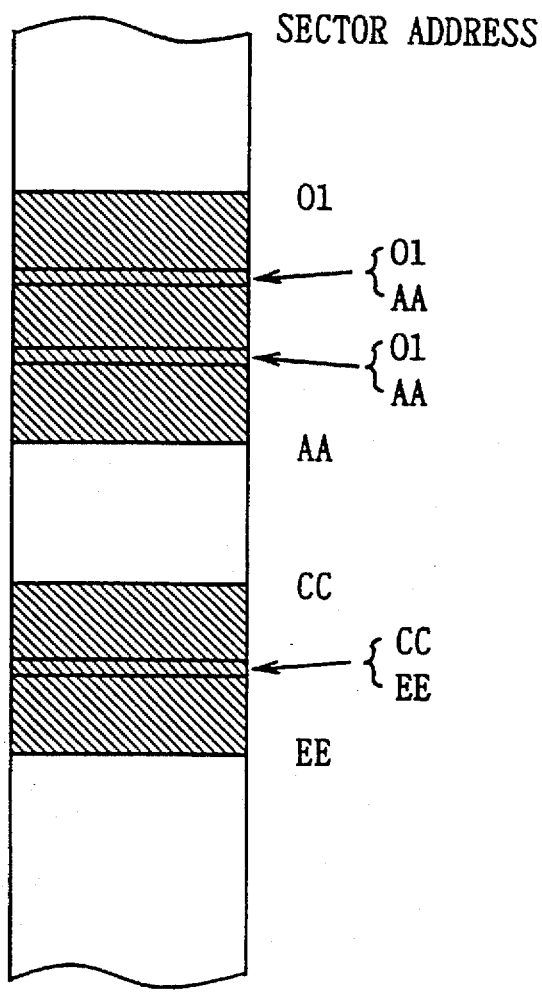
FIG. 15 is a schematic diagram showing a relationship between an entry point and SSA/ESA.

FIG. 15 shows the relationship of SSA/ESA in these entry points. Assuming that a limited part is the interval from the sector address "01" till the sector address "AA" has shown by slants in the figure, then "01"/"AA" is described, as SSA/ESA, in all of the entry points which are included in that interval. Similarly, on the interval from the sector address "CC" till the sector address "EE", "CC"/"EE" is described as SSA/ESA. By describing as these, when a limited part has been reached in high speed searching which also includes the inverse direction of the limitation mode, it is able to decode the nearest entry point, to skip the limited part and to access the next unlimited area which is shown by SSA/ESA, by virtue of the rating descriptor and the SSA/ESA which have been described by the entry point.

Accordingly, if the reproducing apparatus is in the rating mode, a sector in which a risky part data shown by SSA and ESA has been written is always skipped on the basis of seek operation, and reproduction of only usual parts is performed.

That is, as mentioned above with reference to FIG. 4, in the multiplexing scheme of MPEG-system, one multiplex bit stream is composed of one pack or more. A pack includes at least one PES packet or program stream map.

One pack is composed of a header which is composed of a pack-start-code, an SCR (system clock reference), a program-mux rate, etc., and also one or more PES packet. A pack-start-code of a header is a 32-bits code, and is represented as 0x000001b4 by hexadecimal. The length of a pack is defined as variable length and 2048 bytes max. As mentioned above with reference to FIG. 5, one PES packet is composed of a header which is composed of a packet-start-code-prefix, a stream-id, a PES-packet-length, and an optional-PES-header (in which a PTS (presentation time stamp), a DTS (decoding time stamp), etc. are defined), and also a PES packet data. A packet-start-code-prefix is 0x000001 by 24-bits code. A stream-id is a 8-bits code, and represents the species of the PES-packet as shown in FIG.

16. A packet-length (16 bits) shows the length of the subsequent packets.

In a code data of each packet, a video data (in the case of a video stream) or an audio data (in the case of an audio stream) is recorded. In addition, because an audio stream has 32 kinds of different stream-ids and a video stream has 16 kinds of them, it is able to multiplex plural audio signals and plural video signals of these number or less. A program-stream-map has the structure which has been mentioned above with reference to FIG. 10, and uses of a private-stream 1 and a private-stream 2 have been not prescribed as standards. Hence, those can be utilized by a user with free definitions. A padding-stream is utilized to increase a quantity of data. In accordance with the above format, the control device 30 performs processes such as header adding and code reading. In the DSM 29, these input data are recorded in the built-in disk.

Figure 17:
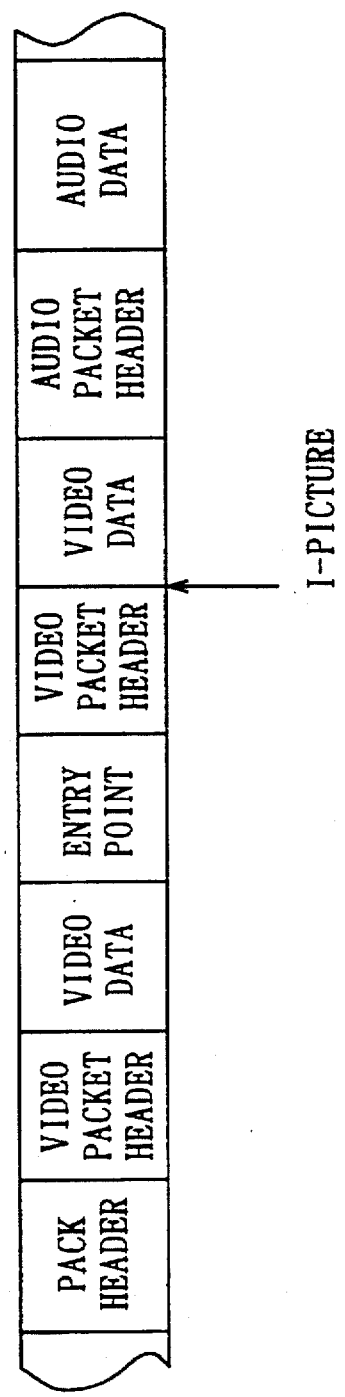
FIG. 17 is a schematic diagram explaining the multiplexed bit stream.

A multiplexed bit stream which is including an entry point is constituted with the format shown in FIG. 17, in the embodiment of FIG. 13, too. That is, at first, a pack-header which is composed of a pack-start-code, an SCR, etc. is placed, then a video-packet-header, and then a video data which is not including an I-picture is placed in a form of packets structure. An entry point is placed next to the video data, then a video-packet-header, and then a video data which is including an I-picture are placed in a form of packets structure. That is, directly before the video data which is including an I-picture (directly before a video-packet-header), an entry point is placed. And, in the case of this embodiment, an audio-packet-header is placed next to a video data, and after that an audio data of packets structure is placed, sequentially.

An entry point is described in a PES packet shown in FIG. 18. This format is one in which a program-stream-directory has been defined by a stream-id with respect to a PES packet. A packet-start-code-prefix is placed to the forefront, and next to that, a stream-id which is represented as 0xff by hexadecimal notation is placed. Next to that, length of the subsequent packet is placed. The above layout is similar to the case of a header of a packet in FIG. 10.

On the forefront part of the program-stream-directory, the number of entry points which are included in that program-stream-map (number-of-access-units) is placed, and also the prev-directory-offset and the next-directory-offset which are showing respectively the positions of the previous and the next program-stream-directories are placed. Further, next to that, three prev-directory-offsets and three next-directory-offsets can be defined. So, the positions of entry-packet−3, entry-packet− 2, entry-packet−1, entry-packet+1, entry-packet+2, and entry-packet+3 are defined sequentially, and, in these, the positions of the entry points of the third on this side of, the second on this side of, the first on this side of, the first beyond, the second beyond, and the third beyond that are written respectively.

In the PES packet, the program stream map can be described in place of a data. The program stream map can define various information which is related to the stream. That is, in the case where the stream-id of the PES packet is 10111100, that PES packet is describing a program stream map. As shown in FIG. 10, the program stream map defines various information (N-loop (information of n pieces)) as a descriptor, following to a header of packet-start-code, etc. FIG. 19 shows a table of Program and program element descriptors which are defined with MPEG, and shows various descriptors which can be defined. A descriptor-tag of 8 bits is added to each descriptor for identification, and then the content is described. For instance, the video-stream-descriptor is defined as shown in FIG. 20.

Figures 21, 23:
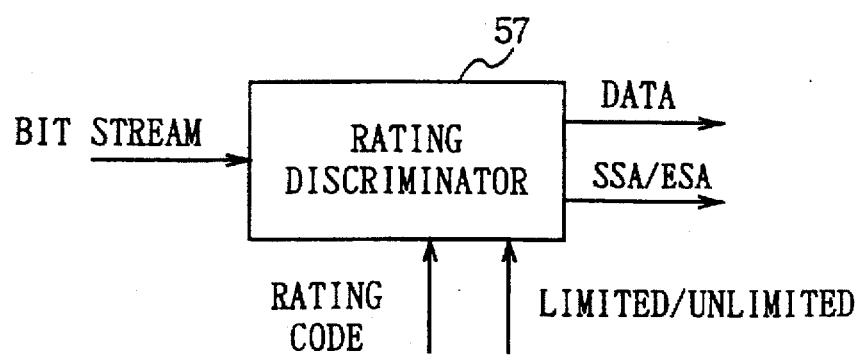
FIG. 21 is a table explaining the rating descriptor.
FIG. 23 is a block diagram showing the rating discriminator in the image data decoding apparatus of FIG. 20.

Giving attention to the table of FIG. 19, private data indicator descriptor lies in No. 15, and Nos. 64 to 255 are released as User Private. So, in this embodiment, Rating descriptor shown in FIG. 21 is defined in the User Private. On this Rating descriptor, descriptor-tag (8 bits), descriptor-length (8 bits), start-sector-address (SSA (32 bits)), and end-sector-address (ESA (32 bits)) are described, at least.

Therefore, if the PES packet is describing the program stream map, and the rating descriptor has been defined in the User Private as the descriptor, then the packets which are following to that PES packet are the limited parts which are risque parts. Hence, a sector in which a data of risque part shown by SSA and ESA has been written can be known by means of an entry point. If the reproducing apparatus is in Rating-on state, then seeking is started such that a data of risque part is skipped from SSA, and returned to reproducing operation at ESA, so that reproduction of the next usual part is started.

Next, rating operation on the image data coding apparatus 20 of FIG. 13 will be explained. The control device 30 receives an entry point generating signal from the video encoder 21 or the video entry point detecting circuit 23, and inserts an entry point into directly before the video entry point (FIG. 17). That is, when it has received the entry point generating signal input, it causes the entry point generating circuit 32 to generate an entry point, and also causes the switching circuit 27 to switch to the input terminal E3 side and to supply to the header adding circuit 28, so as to multiplex that with the video data and the audio data which have reached from the code buffers 24 and 26.

As shown in FIG. 18, in each entry point, the positions of the entry points of the third on this side of, the second on this side of, the first on this side of, the first beyond, the second beyond, and the third beyond that entry point are recorded respectively into three prev-directory-offsets and three next-directory-offsets. The positions of the entry points which are on this side (the past) (that is, positions of the third on this side, the second on this side, and the first on this side) are stored in the entry point storage device 35, hereby these can be known at the time point of recording of the present entry point. Therefore, these can be supplied to the DSM 29 and recorded in the disk at this timing, when necessary.

However, the positions of the entry points of time to come (future) can not be known at the present time point. So the control device 30 memorizes all of positions of the entry points into the entry point memorizing device 35, and, after the time at which all of multiplexing have been ended, that is, after the time at which recording of the bit stream of the video data and the audio data into the disk has been completed, reads the positions of the entry points of the third on this side of, the second on this side of, the first on this side of, the first beyond, the second beyond, and the third beyond each entry point from the entry point memorizing device 35, and then supplies these to the DSM 29 to cause it to record (postscript) into each entry point on the disk.

The video encoder 21 and the audio encoder 25 encode respectively the video signal and the audio signal in variable rate, while the control device 30 controls the header adding circuit 28 and causes it to add a pack header such that intervals of packs come to 2048 bytes. In this way, the control device 30 controls the processes of addition of a header, reading of a code, and insertion of an entry point.

At the time point when the inputs to the video encoder 21 and the audio encoder 25 have come to nothing, the position data is written into the entry point which has been already recorded in the disk. That is, the control device 30 reads the position of the pack which includes an entry point from the entry point memorizing device 35, and causes to write the positions of the preceding three packs and the succeeding three packs which include entry points.

Next, in an image data decoding apparatus 40 shown in FIG. 14, the image data which has been coded with the image data coding apparatus 20 and recorded in the disk of the DSM 29 is decoded. That is, a header separating circuit 42 of a separating device 41 separates the pack header, the packet header, and the entry point from the data which has been read out of the DSM 29 and then supplies them to a control device 44, and also supplies the time-division-multiplexed data to an input terminal G of a switching circuit 43. Output terminals H1 and H2 of the switching circuit 43 are connected to input terminals of a video decoder 45 and an audio decoder 46, respectively.

Besides, the control device 44 reads information which is related to the entry point (information of the entry point) out of the data which has been inputted from the header separating circuit 42, supplies it to the entry point memorizing device 47. Because information of the present read-out position is supplied to the control device 44 from the DSM 29, the control device 44 is able to memorize the position and the content of the entry point such that they will correspond to each other. According to stream-id of the packet header which has been supplied from the header separating circuit 42, the control device 44 of the separating device 41 connects the input terminal G and the output terminals H1 and H2 of the switching circuit 43 sequentially, so that the time-division-multiplexed data is correctly separated, and then the video data is supplied to a video decoder 45 and the audio data is supplied to an audio decoder 46.

Next, rating operation in this image data decoding apparatus 40 will be explained. When rating operation has been commanded, a main control device, which is not shown, instructs the control device 44 to go to the rating mode. The control device 44 monitors the data which has been inputted from the header separating circuit 42, and if Program-stream-map has been find, then always checks whether Rating-descriptor has been described in that or not. In the case where Rating-descriptor has not been found, it operates as usual.

When Rating-descriptor has been found within the data which has been inputted from the header separating circuit 42, the control device 44 reads the value of ESA which has been described within Rating-descriptor, and gives this to the DSM 29 so as to cause it to perform high speed shifting of the read-out position to the first entry point beyond the limited part. When shifting has been completed, the DSM 29 reproduces the data from that entry point and supplies it to the separating device 41. In this manner, the separating device 41 can perform reproduction skipping the limited part, in rating mode.

Next, search operation of this image data decoding apparatus 40 in its rating mode will be explained. When rating operation and search operation have been commanded at the same time, the main control device, which is not shown, instructs the control device 44 to go to the search mode in the rating mode. The control device 44 reads the present read-out position from the output of the DSM 29, and extracts the entry point which is lying near that position from the entry point memorizing device 47. In this entry point memorizing device 47, information of the entry point which has been reproduced at the time of reproduction is memorized whenever occasion demands. Alternatively, at the stated timing, such as the time at which the power source of the device has been switched ON, the time at which the disk has been attached, and the time at which reproduction has been commanded, information of all or the stated range of the entry points which have been recorded on the disk which has been attached to the DSM 29 can be previously read out and stored.

When the control device 44 has found the entry point, the device 44 sends a seek instruction to the DSM 29 so as to cause it to perform high speed shifting of the read-out position to that entry point. When shifting has been completed, the DSM 29 reproduces the data from that entry point and supplies it to the separating device 41. As shown in FIG. 17, the entry point has been placed directly before the video data in which I-picture has been recorded. The header separating circuit 42 of the separating device 41 supplies information which is related to the entry point out of the inputted data to the control device 44. The control device 44 monitors the data which has been inputted from the header separating circuit 42, and if Program-stream-map has been find, then always checks whether Rating-descriptor has been described in that or not.

In the search mode in the rating mode, when Rating-descriptor has been found within the information data which has been inputted from the header separating circuit 42, the control device 44 reads the values of SSA and ESA which has been described within Rating-descriptor, and gives SSA, in the case where searching is being performed in a forward direction (corresponds to flow of time), or ESA, in the case where searching is being performed in a backward direction (reverse direction with respect to time), to the DSM 29 so as to cause it to perform high speed shifting of the read-out position to the first entry point beyond the limited part.

In this way the limited part has been skipped in the search mode, therefore the following processes are similar to that of the case where Rating-descriptor has not been found. That is, in the case where Rating-descriptor has not been found, the video data which is following to the entry point is separated by the header separating circuit 42 and supplied to the video decoder 45, where the first picture of this video data is I-picture. The video decoder 45 decodes the firstly occurred I-picture and outputs it, immediately.

Position information of the preceding three entry points and the succeeding three entry points of unlimited part has been recorded in the entry point of the limited part, so the control device 44 causes to repeat the operations of searching and reproducing of the entry point of the next unlimited part from that position information. Hereby, I-picture is rapidly, sequentially and continuously reproduced. When the search speed is fast, accessing to the farther entry point of the unlimited part is caused by the control device 44, while the search speed is slow, accessing to the nearer entry point of the unlimited part is caused by the device 44. Because three entry points of forward direction and three entry points of reverse direction have been recorded, three or more steps of variation of search speed can be provided by combinations of entry points which are selected. In this connection, in the case where Rating-descriptor has been found during search operation, skipping of the part is performed, again.

Figure 22:
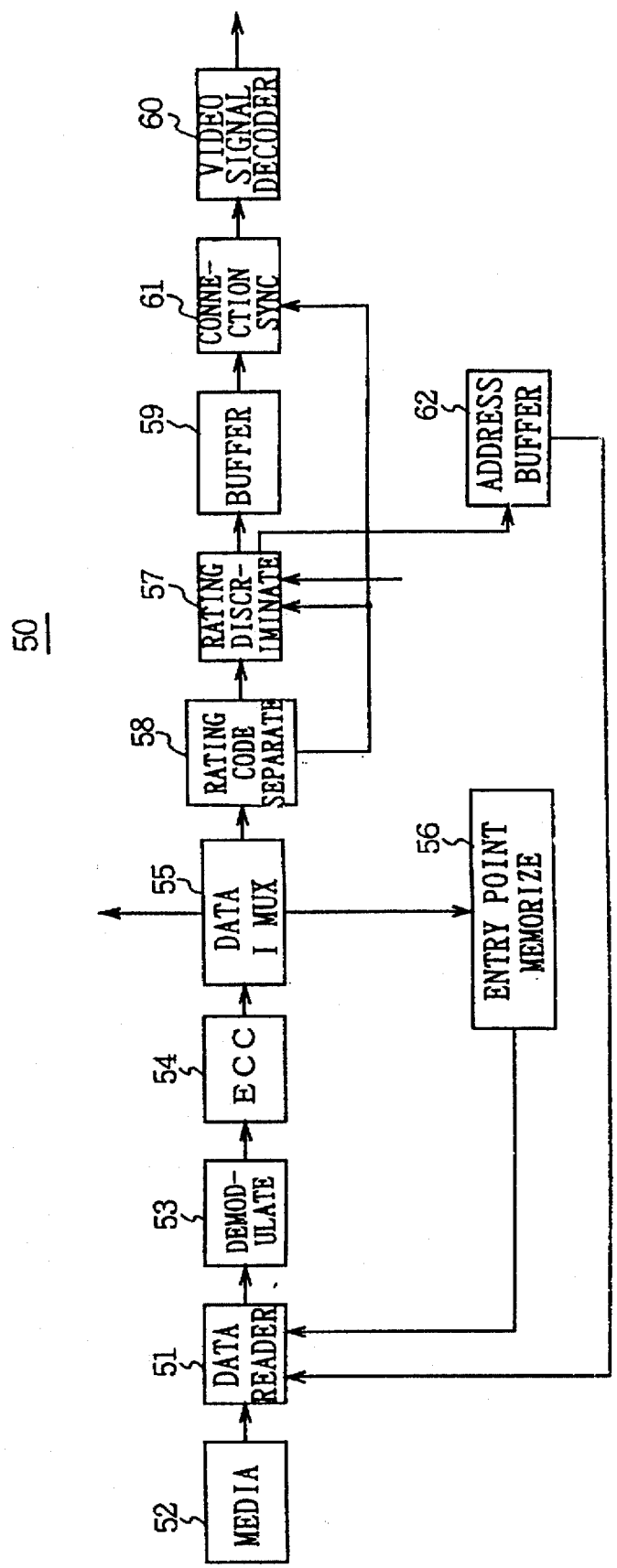
FIG. 22 is a block diagram showing the image data decoding apparatus off the other embodiment.

FIG. 22 shows the actual constitution of the abovementioned image data decoding apparatus. That is, in this image data decoding apparatus 50, a data reader 51 accesses media 52, reproduces the data which has been recorded therein, and outputs it to a demodulator 53. In the case where media 52 is a magnetic disk, the data reader 51 is composed of a magnetic head, while in the case of an optical disk, an optical head. The demodulator 53 demodulates the data which has been supplied from the data reader 51.

The demodulated data is subjected to error detection and correction by an error detecting and correcting circuit (ECC)

54, and then inputted to a data inverse-multiplexer 55. The data inverse-multiplexer 55 separates the data into the video signal and the audio signal, and outputs the audio signal to the audio decoder circuit (not shown). Further, the entry point data is separated by the inverse-multiplexer 55, supplied to and stored in the entry point memorizing device 56. According to this stored value, the data reader 51 is controlled, and the accessing position of it is changed.

A rating code separator 58 is placed between the data inverse-multiplexer 57 and a rating discriminator 57, and a connection synchronizer 61 is placed between a buffer 59 and an image signal decoder 60. The rating code separator 58 separates a rating code from the bit stream of the inputted data, and supplies it to the rating discriminator 57 and the connection synchronizer 61.

Besides, the video data which is obtained from the data inverse-multiplexer 55 is inputted to the rating code separator 58, and the data is taken out of each packet. At this time, it is read, from the packet, that the packet is a program stream map, and also the rating descriptor is read, and then outputted to the rating discriminator 57.

Hereupon, as shown in FIG. 23, the rating discriminator 57 performs discrimination of the rating mode, corresponding to the bit stream and the rating code which have been supplied from the rating code separator 58. That is, in the case where a rating tag of the rating descriptor is showing the limited interval, the image data which is inputted at that time is the limited data which is to be subjected to rating, therefore it is not supplied to the buffer 59. At the same time, seek operation is commanded to a tracking control circuit, etc. which are not shown. Besides, SSA/ESA is detected and its address is supplied to an address buffer 62.

The purpose of the connection synchronizer 61 is that displaying of the image is adjusted to the timing of the audio signal. That is, in the case where seeking has been performed on the basis of rating operation, switching of video and audio occurs. As to video, switching is not a problem, because it is recognized as a scene change. On the contrary, switching of audio is perceived as an evident discontinuity. So, in audio, it is needed to perform connection such as fade-out and fade-in, together with starting of rating operation. Hence, the connection synchronizer 61 adjusts the timing of image displaying in a synchronized manner with processing of audio.

An image signal decoder 60 performs inverse variable length coding of the coded bit stream given from the connection synchronizer 61 by means of an inverse variable length coder (IVLC) which is not shown, and performs inverse quantization for each block by means of an inverse quantizer, and further performs inverse DCT processing by means of an inverse DCT circuit. The inverse quantizer and the inverse DCT circuit operate complimentarily with the encoder side, respectively. In this way, the video which has been reproduced from the media 52 is displayed on a displaying device. When seek operation has been performed until, for instance, the sector which is corresponding to ESA, the next entry point is read and stored in the entry point memorizing device 56. From that entry point, the data reader 51 reads data. Such operations are repeated sequentially, so that rating reproduction is performed.

The capacity of the buffer 59 is determined so as to be a capacity which is sufficient even if data loss has occurred due to seeking. The data rate of reading out of the media 52 such as a disk is set to be greater than the average data rate, and, to put it concretely, twice the average data rate or more is desirable. In this way, during seek operation, the data within the buffer 59 is decoded by the image data decoder 60, and which is perceived as a continuous image by a viewer. Because reading of the data out of the media is performed at a high rate of speed, the data within the buffer 59 is not emptied. Therefore, it is not perceived that the image of the limited part has been eliminated due to rating.

On the other hand, in the unlimited mode, a signal of unlimited mode is supplied to the rating discriminator 57. SSA/ESA is supplied to the address buffer 62, however the data reader 51 don't perform seek operation and reads the data just as it is. Therefore, the video data of the limited parts is supplied to the buffer 59, and the image signal decoder 60 decodes the moving image which includes the limited parts.

According to the above constitution, in the case where a rating code has been found within the entry point in reproducing operation, the succeeding video data is not reproduced and the reproducing operation skips to the next address which is to be reproduced. During this event, the reproduced image is uninterruptedly displayed as a consecutive image, by virtue of a difference between the data rates. In addition, the video data which is following to the entry point to which it has skipped is a GOP which certainly starts from I-picture and, therefore, can be surely reproduced. Because variable speed reproduction certainly identifies the entry point and then operates, it is needed to read certainly the entry point, therefore the rating code within the entry point is certainly detected, so that rating operation can be surely performed.

As described above, according to the present invention, in order to differentiate the reproduction data of the limited part which is to be eliminated by rating from the data of the unlimited part, a rating code is added; hereby an image data coding apparatus and method thereof, an image data recording medium, and an image data decoding apparatus and method thereof can be realized, which is able to reproduce the unlimited part consecutively without reproduction of the limited part in the rating mode, diminish the waste time, and inhibit interruption of the high speed reproduced image.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An image data coding method for recording digital moving image data and digital aural data on a recording medium in a time-division multiplexing manner, comprising the steps of:

partitioning at least said digital moving image data into packets;

detecting an entry point included in a coded image in a frame which is present, by at least one sheet, in said packet;

adding a rating code to said entry point, said rating code including start and end addresses of a risque part of said digital moving image data;

inserting said entry point between said packets of said digital moving image data to form a data bit stream; and recording said data bit stream on said recording medium.

2. The image data coding method according to claim 1, wherein said rating code is composed of at least a code identifying a packet of said digital moving image data containing a risque part.

3. An image data coding apparatus for recording digital moving image data and digital aural data on a recording medium in a time-division multiplexing manner, said apparatus comprising:

means for partitioning at least said digital moving image data into packets;

means for detecting an entry point included in a coded image in a frame which is present, by at least one sheet, in said packet;

means for adding a rating code to said entry point, said rating code including start and end addresses of a risque part of said digital moving image data;

means for inserting said entry point between said packets of said digital moving image data to form a data bit stream; and means for recording said data bit stream on said recording medium.

4. The image data coding apparatus according to claim 3, wherein said rating code is composed of at least a code identifying a packet of said digital moving image data containing a risque part.

5. An image data recording medium having recorded digital moving image data and digital aural data thereon in a time-division multiplexing manner, wherein at least said digital moving image data is partitioned into packets;

a rating code is added to an entry point included in a coded image in a frame which is present, by at least one sheet, in said packet, said rating code including start and end addresses of a risque part of said digital moving image data; and said entry point is inserted between said packets of said digital moving image data to form a data bit stream, said data bit stream being recorded thereon.

6. The image data recording medium according to claim 5, wherein said rating code is composed of at least a code identifying a packet of said digital moving image data containing a risque part.

7. An image data decoding method for reproducing coded image data from a recording medium in which digital moving image data and digital aural data have been recorded with time-division multiplexing, in such a manner that at least said digital moving image data has been partitioned into packets, a rating code has been added to an entry point included in a coded image in a frame which is present, by at least one sheet, in said packet, said rating code including start and end addresses of a risque part of said digital moving image data and said entry point has been inserted between said packets of said digital moving image data to form a data bit stream and said data bit stream being recorded thereon, comprising the steps of:

reading said data bit stream from said recording medium;

detecting at least one entry point from said data bit stream;

detecting whether said rating code exists in said entry point;

searching for another entry point in said data bit stream if it is determined that said rating code exists in said entry point;

reproducing said data bit stream from said recording medium if it is determined that said rating code does not exist in said entry point; and decoding said coded image data from said reproduced data bit stream.

8. The image data decoding method according to claim 7, wherein said rating code identifies a packet of said digital moving image data containing a risque part; wherein said step of detecting includes detecting at least a start address and an end address of said packet containing said risque part from said rating code; and wherein said step of searching searches for said other entry point in accordance with said start address or said end address.

9. An image data decoding apparatus for reproducing coded image data from a recording medium in which digital moving image data and digital aural data have been recorded with time-division multiplexing, in such a manner that at least said digital moving image data has been partitioned into packets, a rating code has been added to an entry point included in a coded image in a frame which is present, by at least one sheet, in said packet, said rating code including start and end addresses of a risque part of said digital moving image data and said entry point has been inserted between said packets of said digital moving image data to form a data bit stream and said data bit stream being recorded thereon, comprising:

means for reading said bit stream from said recording medium;

means for detecting at least one entry point from said data bit stream;

means for detecting whether said rating code exists in said entry point;

means for searching for another entry point in said data bit stream if it is determined that said rating code exists in said entry point;

means for reproducing said data bit stream from said recording medium if it is determined that said rating code does not exist in said entry point; and decoding said coded image data from said reproduced data bit stream.

10. The image data decoding apparatus according to claim 9, wherein said rating code identifies a packet of said digital moving image data containing a risque part; wherein said means for detecting includes means for detecting at least a start address and an end address of said packet containing said risque part from said rating code; and wherein said means for searching is operable to search for said other entry point in accordance with said start address or said end address.

* * * * *